United States Patent

[11] 3,615,163

[72] Inventor Stanley F. Brzozowski
   New Martinsville, W. Va.
[21] Appl. No. 884,827
[22] Filed Dec. 15, 1969
[45] Patented Oct. 26, 1971
[73] Assignee PPG Industries, Inc.
   Pittsburgh, Pa.

[54] TREATMENT OF TITANIUM TETRACHLORIDE WASTE GAS
   7 Claims, 1 Drawing Fig.

[52] U.S. Cl. .................................................. 23/2 C,
   23/1, 23/87 T, 23/202 V
[51] Int. Cl. ..................................................... B01d 47/00,
   C01g 23/02, C01g 23/06
[50] Field of Search ................................. 23/87, 87 T,
   202, 1, 182, 139, 140, 150, 2 C

[56] References Cited
UNITED STATES PATENTS

| | | | |
|---|---|---|---|
| 1,451,399 | 4/1923 | Low .............................. | 23/182 X |
| 2,486,912 | 11/1949 | Belchetz ....................... | 23/87 |
| 2,533,021 | 12/1950 | Krchma ........................ | 23/87 X |
| 2,867,501 | 1/1959 | Hanley ......................... | 23/145 |
| 3,118,732 | 1/1964 | Richards et al. .............. | 23/87 X |
| 3,219,411 | 11/1965 | Cheever et al. ............... | 23/202 |

*Primary Examiner*—Edward Stern
*Attorney*—Chisholm and Spencer

ABSTRACT: Waste gas from the chlorination of titaniferous ores is treated with steam before being vented and burned.

PATENTED OCT 26 1971
3,615,163
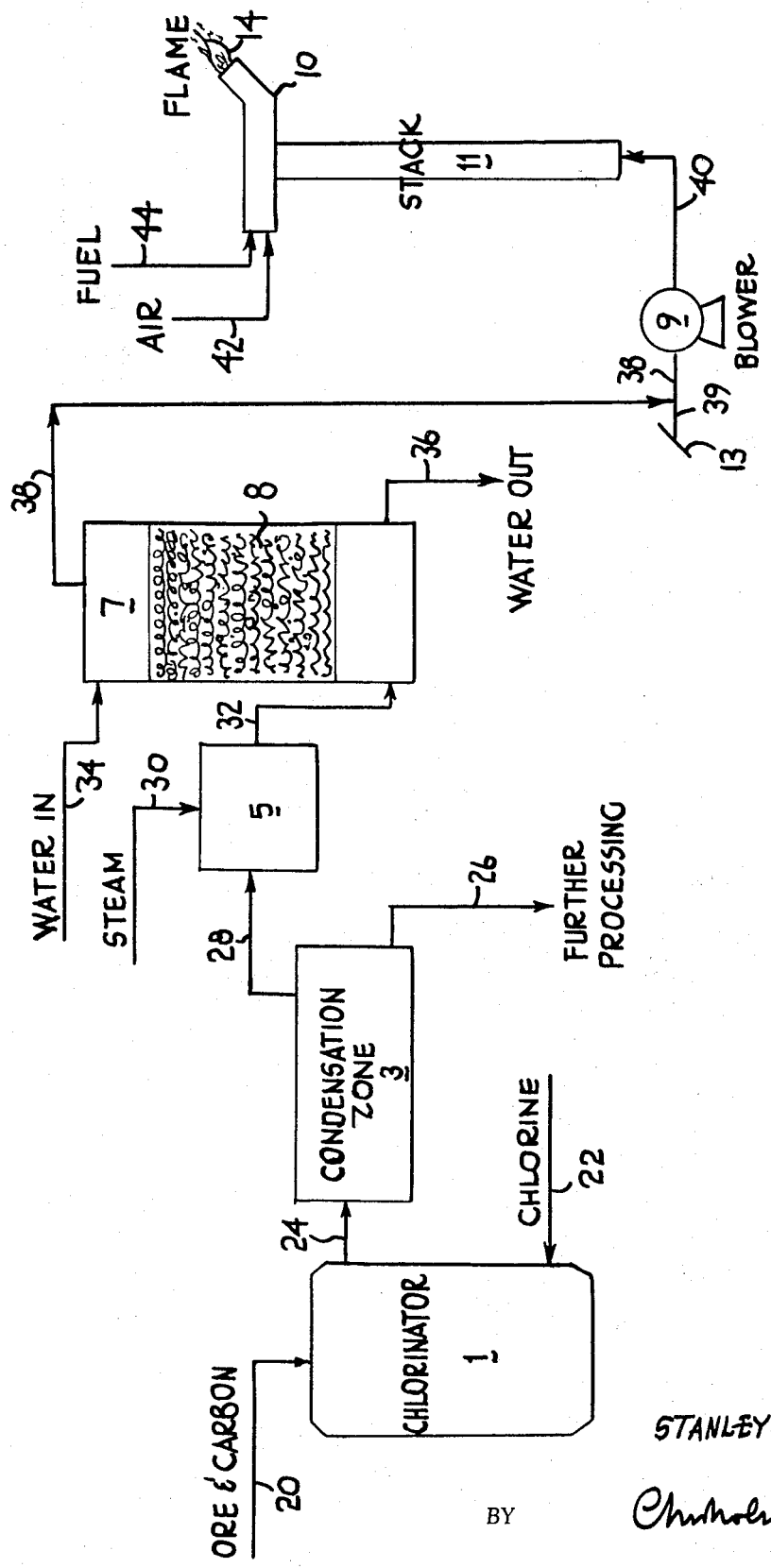
INVENTOR
STANLEY BRZOZOWSKI
BY Chisholm ul Spencer
ATTORNEYS

TREATMENT OF TITANIUM TETRACHLORIDE WASTE GAS

BACKGROUND OF THE INVENTION

Titanium tetrachloride is produced conventionally by chlorinating a titaniferous ore, such as ilmenite, rutile, arizonite, leucoxene and titanium slags and concentrates, in the presence of carbon or other carbonaceous materials at high temperatures. In addition to titanium tetrachloride, the chlorination product mixture comprises carbon monoxide, carbon dioxide, chlorine, and the chlorides and oxychlorides of metallic and nonmetallic impurities present in the ore and carbonaceous material. The reaction product is condensed and later purified by chemical and physical steps well known to the person skilled in the art. The uncondensed portion of the product effluent, i.e., the waste gases comprising carbon dioxide, carbon monoxide, etc., are typically removed to a scrubbing zone wherein noxious components, e.g., chlorine, residual titanium tetrachloride, etc., are removed before venting the waste gas to the atmosphere. Since the waste gas contains a significant proportion of carbon monoxide, the combustible portion of the waste gas stream is typically burned. During periods of extended production of titanium tetrachloride, it has been observed that a gelatinous-type material accumulates in the gas line handling the scrubbed waste gas stream. In particular, the accumulation occurs in the centrifugal blower in this line, e.g., on the blower impellors and internal blower casing and eventually blocks the blower. When such blockage occurs, the entire chlorination process must be shut down.

BRIEF SUMMARY OF THE INVENTION

It has now been discovered that if the titanium tetrachloride waste gas stream is treated with steam before being scrubbed with water, the above-mentioned formation of gelatinous material is avoided and uninterrupted problem-free operation of the waste gas treatment zone results.

DETAILED DESCRIPTION

Titanium tetrachloride is commonly produced by reacting, at high temperatures, a titaniferous ore, such as ilmenite or rutile, with chlorine and a reducing agent, such as carbon or other carbonaceous materials, in a static bed or fluosolids operation. The carbonaceous reductant utilized can be any carbon-containing reducing agent that is substantially hydrogen-free since the presence of hydrogen results in the formation of hydrogen chloride which both in increases the consumption of chlorine and presents corrosion difficulties. Typically coke and carbon monoxide are employed; however, other carbon-containing reducing agents, such as graphite, charcoal, etc., can be employed. The amount of carbonaceous reductant admixed with the titaniferous ore will vary; however, typically, the amount ranges from about 10 to about 50 percent by weight, usually from 10 to about 30 percent by weight of the total composition of the feed to the chlorinator. Chlorination temperatures of titaniferous ores typically range from about 700 to 1,100° C.

The product effluent removed from the chlorinator typically comprises vaporous titanium tetrachloride, as well as other metal halide components of the metals and nonmetal components contained in the titaniferous ore and carbon reductant that are vaporizable at the chlorination temperatures, together with carbon dioxide, carbon monoxide, and chlorine. Typical of such other metal halide components are the chlorides of iron, silicon, tin, vanadium and chromium. This product stream is removed from the chlorinator and forwarded to a condensation zone where the normally liquid (at ambient temperature and pressure) components of the effluent gas stream are condensed. The condensed components are forwarded to purification and/or separation zones wherein purified titanium tetrachloride is recovered as the principal product. The uncondensed components of the effluent gas stream, principally carbon dioxide, carbon monoxide, chlorine, and residual metal halides, such as titanium tetrachloride, silicon tetrachloride, chromic chloride and tin chloride, are forwarded to a scrubbing zone to remove any noxious components therefrom before being vented to the atmosphere. Typically, the scrubbing zone comprises a conventional water or caustic scrubber. Following scrubbing, the waste gas stream is typically diluted with air, and forwarded to a vent stack wherein the combustible components thereof, i.e., principally carbon monoxide, are burned.

During extended periods of titanium tetrachloride production in accordance with the aforementioned process, it has been found that a gelatinous substance accumulates in the waste gas blower. Such accumulation eventually blocks the blower and requires that it be shut down. When such blockage occurs, the entire chlorination process also must be shut down. When the gelatinous-type material found in the blower was analyzed, it was found that it was composed chiefly of the hydrolysis products of the residual metal halides, e.g., titanium, silicon, etc., left in the waste gas stream. It has now been discovered that formation of the aforementioned gelatinous substance, which is extremely sticky, can be avoided by treating the waste gas stream before scrubbing step with steam.

Referring now to the drawing, ore, carbon and chlorine are introduced into chlorinator 1 as indicated by lines 20 and 22 respectively. Product vapors from the chlorinator are removed from chlorinator 1 and forwarded to condensation zone 3 as indicated by line 24. The product from condensation zone 3 is removed therefrom, as indicated by line 26, and subjected to further processing, e.g., chemical purification and rectification, in a art-recognized manner. Uncondensed vapors (the waste gas stream) are removed from condensation zone 3 as indicated by line 28 and in accordance with the invention described herein introduced into vessel 5 to which steam is also introduced as indicated by line 30. Vessel 5 can be of any suitable acid resistant vessel capable of handling the volumes of waste gas and stream introduced therein.

Steam is introduced into vessel 5 in a manner which results in intimate contact between the waste gas stream and steam. Typically, several steam lines, preferably with sparging nozzles, are connected to vessel 5 so as to insure intimate waste gas-steam contact. The resulting vapors are removed from vessel 5, as indicated by line 32, and introduced into scrubber 7 which, as shown, is a countercurrent packed water scrubber. As shown, the vapors from vessel 5 enter the bottom of scrubber 7 and pass upwards through packing 8 countercurrent to a downwardly flowing stream of water charged to scrubber 7 from a source not shown through line 34. Scrubbed waste gas vapors are removed from scrubber 7, as indicated by line 38. Water is removed from the scrubber as indicated by line 36.

The amount of steam with which the waste gases is treated can vary, but typically will be that amount which is necessary to avoid formation of the gelatinous material in the blower following scrubbing. Usually, this amount will be that amount which is sufficient to hydrolyze any residual hydrolyzable titanium tetrachloride contained in the waste gas stream. Preferably, sufficient steam is used to hydrolyze all of the residual hydrolyzable metal halide components of the waste gas stream, e.g., the chlorides of silicon, titanium, chromium, tin, etc. Generally, because of the minimal cost of plant steam, which is usually available in the immediate plant area, a stoichiometric excess (based on residual $TiCl_4$)of steam, e.g.,1 to 10times the theoretical stoichiometric is utilized.

The exact manner by which steam treatment of the titanium tetrachloride waste gas stream in the manner described herein prevents formation of the gelatinous residue previously described in not exactly known. It is believed, however, that the steam, by virtue of the existence of fine water vapor particles present therein, effects more intimate contact (and therefore more complete hydrolysis) with the finely divided metal halide particles suspended in the waste gas than is obtained by the water scrubber. It is also believed that the hydrolysis product of, for example, titanium tetrachloride with steam as opposed to water, is different, e.g., less sticky and gelatinous.

The type of steam (temperature and pressure) used can be any conveniently available plant steam line. Typically, the steam pressure will vary from 0 p.s.i.g. to 100 p.s.i.g., more typically from 10 to 50 p.s.i.g., the temperatures of which will vary respectively from 212° F. to 330° F., more typically from 240°F. to about 280°F. Usually, steam having temperatures below 350°F., more usually below 300°F. is used. The aforementioned properties are those of saturated steam.

In carrying out the process of the present invention, it is unnecessary to heat the waste gas steam, either before, during or after steam treatment (but before flaring) to temperatures of 200° C. (392°F.) or more, in accordance with Japanese Pat. No. 7414, for the reason that the hydrolysis products produced in vessel 5 are removed from the system by means of water scrubber 7. The present invention is, thus, easily adaptable to existing facilities and more economic in the use of readily available plant steam and low pressure equipment.

The water used in scrubber 7 is typically untreated plant water, e.g., river or well water, which is used at their respective prevailing temperatures. The amount of water used in scrubber 7 is that amount which is sufficient to obtain intimate contact between it and the waste gas stream and effectively remove all the noxious and otherwise detrimental components of the stream, e.g., chlorine, and the hydrolysis products of the residual metal halide components of the stream. Typically, the ratio of water to waste gas will be from about 15 to about 20 pounds of water per pound of gas.

The type of packing used in scrubber 7 can be of any conventional packing, such as Raschig rings, Berl saddles, glass, crushed stone, stoneware rings, etc. Although a packed scrubber is shown in the Figure, any type of water scrubber which provides intimate water-gas contact can be used. As the steam treated waste gas passes through scrubber 7, the steam introduced into the waste gas in vessel 5 is condensed and flushed out together with the residual metal halide hydrolysis products by the scrubbing water.

Thus treated waste gas, now consisting principally of carbon dioxide and carbon monoxide, is removed from scrubber 7, as indicated by line 38, and forwarded to blower 9 wherein the waste is admixed with air in quantities that is sufficient to prevent the formation of $CO/O_2$ explosive mixtures. Air is introduced into line 38 through damper 13 and line 39 which is openly connected to line 38. Typically, sufficient air is aspirated into the waste gas stream so that the carbon monoxide content thereof is maintained below 14 volume percent. The operation of the blower creates a vacuum on the intake side of the blower, which expedites the movement of waste gas from the scrubber to the blower. After admixture with air, the waste gas stream is forwarded from blower 9 to vent stack 11, as indicated by line 40, and burned in flare 10 as flame 14. Combustion of the combustible portion of the waste gas stream is accomplished by introducing air and a fuel, usually natural gas, into flare 10 from sources not shown through lines 42 and 44 respectively and igniting the fuel. The flame produced by the flare is typically operated at at least 1,600° F., usually between 1,600 and 1,900° F., to insure complete combustion.

The present process is more particularly described in the following examples which are intended as illustrative only since numerous modifications and variations therein will be apparent to one skilled in the art.

EXAMPLE I

Australian rutile was chlorinated in a suitable fluidized bed reactor using calcined petroleum coke as the source of carbon reductant at temperatures of about 925°C. The coke represented about 20 weight percent of the initial bed charge. Titanium dioxide conversion was greater than 99 percent. Product effluent gases were removed from the top of the reactor and forwarded to a condensation zone maintained at from about −12 to −18°C. Waste gas from the condenser was forwarded directly to a packed tower countercurrent flow water scrubber and thereafter diluted with air to a concentration of less than 14 volume percent carbon monoxide and burned in a flare with the aid of natural gas. After 14 days of operation a gelatinous material, which upon analysis was found to be chiefly hydrous titania, formed in the blower. The accumulation of this gelatinous substance fouled the blower causing operational difficulties therewith and forcing an unscheduled shutdown of the entire process.

EXAMPLE II

Australian rutile ore was chlorinated in a manner analogous to example 1, except that the waste gas from the condenser was first intimately contacted in an acid resistant steel shell vessel with about 30 p.s.i.g. saturated steam having a temperature of about 250° F. and the steam-waste gas effluent from this vessel introduced into the water scrubber. The blower operated trouble free with no accumulation of gelatinous material through at least 200 days of total operation.

The date examples I and II illustrate that contacting titanium tetrachloride waste gas steam prior to water scrubbing prevents fouling of the blower in the waste gas line and result in trouble-free operation of the waste gas treatment zone.

While there are above described a number of specific embodiments of the present invention, it is obviously possible to produce other embodiments and various equivalent modifications thereof without departing from the spirit of the invention.

Having set forth the general nature and specific embodiments of the present invention, the true scope is now particularly pointed out in the appended claims.

I claim:

1. In a process of treating a titanium tetrachloride waste gas stream wherein said stream is scrubbed with water, the improvement which comprises avoiding gelatinous accumulations in the gas line through which the scrubbed waste gas free flows by intimately contacting said waste gas stream at temperatures below 200° C. with steam in amounts sufficient to hydrolyze substantially all of the hydrolyzable metal chlorides present therein before scrubbing the waste gas stream with water.

2. The process of claim 1 wherein the steam temperature is from about 212° F. to about 330°F.

3. The process of claim 1 wherein the ratio of water to waste gas in the scrubbing step is from about 15 to about 20 pounds of water per pound of gas.

4. The process of claim 1 wherein the combustible portion of the waste gas stream is burned after being scrubbed with water.

5. The process of claim 4 wherein the waste gas stream is diluted to a carbon monoxide content of less than 14 volume percent before being burned.

6. The process of claim 4 wherein the waste gas flame temperature is at least 1,600° F.

7. The process of claim 1 wherein the amount of steam used is from one to 10 times the stoichiometric amount required to hydrolyze the residual titanium tetrachloride present in said waste gas stream.

* * * * *